United States Patent [19]

Miller et al.

[11] Patent Number: 4,641,586
[45] Date of Patent: Feb. 10, 1987

[54] MAGNETIC SUSPENSION RAILWAY

[75] Inventors: Luitpold Miller; Hans-Georg Raschbichler, both of Ottobrunn, Fed. Rep. of Germany

[73] Assignee: Thyssen Industrie AG, Fed. Rep. of Germany

[21] Appl. No.: 232,587

[22] Filed: Feb. 9, 1981

[30] Foreign Application Priority Data

Feb. 8, 1980 [DE] Fed. Rep. of Germany ....... 3004704

[51] Int. Cl.$^4$ ............................................. B60L 13/06
[52] U.S. Cl. .................................... 104/284; 104/293
[58] Field of Search ............... 104/281, 282, 283, 284, 104/287, 288, 290, 291, 292, 293

[56] References Cited

U.S. PATENT DOCUMENTS

| | | | |
|---|---|---|---|
| 3,626,858 | 12/1971 | Colling et al. | 104/291 X |
| 3,937,148 | 2/1976 | Simpson | 104/284 X |
| 4,029,020 | 6/1977 | Nakamura et al. | 104/284 |
| 4,181,080 | 1/1980 | Miller | 104/281 |
| 4,280,412 | 7/1981 | Mihirogi | 104/281 |

FOREIGN PATENT DOCUMENTS 2626439  1/1980  Fed. Rep. of Germany .

*Primary Examiner*—Robert B. Reeves
*Assistant Examiner*—David F. Hubbuch
*Attorney, Agent, or Firm*—McGlew and Tuttle

[57] ABSTRACT

A magnetic suspension for a railway vehicle with electromagnetic carrying, guiding and driving gear, wherein the forces of the exciter and transverse flux magnets support, guide, drive and brake together with an active motor section by regulating the gap distance from a track-side reaction rail measured by gap, measured by gap sensors, and wherein the vehicle includes hover frames and the magnets are resiliently mounted to the hover frames in such a way that both supporting and guiding magnets as well as the carrying magnets of the two longsides of the vehicles are separated from each other as to action and the hover frames are coupled to the vehicle superstructure through spring means is disclosed. Each magnet includes at least four coils and the transvers flux magnets have adjacent coils with coil lengths selected so that within the magnet coil peripheries of the adjacent coils, lying side by side, do not coincide. The coils of the magnets are divided into two identical groups and the coils of each group are distributed over the total length of the magnets so as to supply the torques required for stabilization of the pitch movement of the vehicle. The coils of each group are operable responsive to an autonomous gap control loop. The supporting and guiding magnets have glide skids for limiting the free motion play in the vertical and horizontal directions relative to the track to a predetermined gap deviation to be expected in service.

5 Claims, 8 Drawing Figures

MAGNETIC SUSPENSION RAILWAY

FIELD AND BACKGROUND OF THE INVENTION

The invention relates to a magentic suspension railway, with electromagnetic carrying, guiding and driving gear. In such a railway, the forces of supporting and guiding magnets carry, guide, drive and brake the railway vehicle. The magnets regulate gap distances from track-side reaction rails to support structures of the vehicle, these distances being measured by gap sensors. The magnets are mounted in the support structures through spring systems in such a way that both the supporting and guiding magnets, as well as supporting magnets at lateral sides of the vehicle, are decoupled from each other. The support structures are also coupled to the vehicle superstructure or body through spring systems.

A magnetic suspension railway of this kind is described in Thyssen Technische Berichte (Technical Reports) January, 1979, and in West German Offenlegunschrift 26 26 439. The known suspension arrangement which is connected to the support structure requires a high stiffness and precision and a magnet spring system having a relatively high minimum stiffness to ensure static stability relative to a pitch axis of the magnets and a sufficiently exact parallel guidance of the magnets relative to the support structure or vehicle. The relatively high natural frequencies of the magnet suspension resulting from the high stiffness lead, especially upon disturbances occurring in electrical service, to great gap deviations or high dynamic requirements for the magnets, respectively. In case of de-excitation of the magnets, upon setting down or upon failure of several successively arranged magnets or of all magnets of a hover or support structure, it is a known practice to dispose gliding and set-down skids on the vehicle or support structures, upon which the load can be set down on the track surface. In this connection, spring-supported glide skids are used, so as to attenuate the shock loads on the rail and on the vehicle when the vehicle falls. This insures a stable gliding phase for the vehicle on the rail. In addition the high-frequency disturbances of the gliding phase are not completely transmitted to the hover structure or the vehicle. Fall gaps of 10 to 20 mm in this connection, must be expected and upon lifting of the vehicle, magnet gaps of 30 to 44 mm may occur because of the spring motion of a single-magnet spring system upon de-excitation of the magnets. This means that the lifting and the regulated set-down process will undesirably require substantial increases in the size of the magnets, and the carrying and guiding power to be used, as well as respective separate protection for the magnetic flux supplies.

Moreover, as the vehicle falls, there occurs in the vehicle and in the track, at discrete points, according to the number of glide skids per vehicle, dynamic shock loads which are approximately two to three times as great as the evenly distributed carrying and guiding forces in normal operation. The respective design sizes of track and vehicle, above all, in a vertical direction and in a travel direction to accommodate these loads, have an expecially strong cost-increasing effect on the total system.

The following known measures have been taken to improve the falling behavior occurring upon failure of individual magnets: over-dimensioning of the individual magnets, active control of the initial tension of the magnet spring system, and higher stiffness of the magnet suspension and the hover structure frames. If over-dimensioning of the magnets is to be dispensed with in favor of active control, it is necessary, due to the plurality of magnets needed, to require relatively complex regulating, control and switching means in both planes of the spring support. If this drawback is to be avoided in the system according to the prior art, the high stiffness of the magnet suspension and large nominal gaps of the magnets will have to be accepted. This means a further worsening of the weight balance and the service behavior of the system and higher investment costs for the track as well. Also, the car box spring suspensions must be given correspondingly larger dimensions.

SUMMARY OF THE INVENTION

Proceeding from this state of the art, an object of the invention is the development of a magnetic suspension railway wherein, even upon failure of several or all magnets, the guiding forces remain uniformly distributed over the total length of the vehicle, the carrying and guiding magnets can be without high precision requirements for small gap distances, even when traveling along curves and thus, structural elements of the vehicle and track can have small dimensions.

According to the invention, a magnetic suspension railway arrangement is structured so that (a) each magnet has four or more coils; (b) the lengths of the turns of the coils of transverse flux magnets in the arrangement are selected so that within the magnet the coil periphery of the adjacent coils, lying side by side, do not coincide; (c) the coils of the magnets are divided into two identical groups in such a way that the coils of each group are distributed over the total length of the magnet to the full extent possible, and are arranged so that the groups supply torques required for the stabilization of pitch movement; (d) the coils of each group are assigned to an autonomous gap control loop; and, (e) the free motion play of the carrying and guiding magnets relative to the track is limited to the gap deviations to be expected during service, by glide means in vertical and horizontal directions. By having four or more coils and the group arrangement of the coils according to features (c) and (d) above, the instability around the pitch axis of the magnet, which is proportional to the magnet length, is eliminated. The supporting or carrying magnets have a horizontal pitch axis and the guiding magents have a vertical pitch axis. The group arrangement of the magnets according to feature (d) makes it possible, without large sizes, to ensure pitch stability which is sufficient in normal operation, when traveling over rail gaps, as well as at rail joints and switches, and minimizes the carrying collapse in power when there is a failure in the control circuit for powering the magnets.

The stability achieved in two degrees of freedom, according to the inventive arrangement, in the translatory direction along the line of action of the magnetic force, as well as in the rotary direction about the pitch axis, offers the design advantage that there are no requirements for precision and stiffness in the magnet suspension and the suspension frames to ensure parallel effects of the magnets in the lengthwise direction. Corresponding tolerances and elasticity values do not influence the maintenance of the magnet gap size, that is, the gap between the magnet and the track. The play of the supporting and guiding magnets relative to the track is limited by the gliding means, in the vertical and the horizontal direction. The play is limited to the gap deviations to be expected during service. Thus, in the case of an over-control of under-control of several control loops lying one behind the other in the lengthwise direction of the vehicle, attracting or repelling force of the magnet beyond the gap error, which is permitted in normal operation, is prevented. Consequently, even during failure situations, the magnet does not leave its nominal gap range which is defined by dynamic deviations in the magnetic field and structural tolerances. The vehicle will not set down or fall down on the rail. A controlled redistribution of the static loads as used in the prior art, thereby becomes superfluous even upon failure of several autonomous gap regulating circuits lying one behind the other in the travel direction. Neither switching processes, nor changes of the magnet hinge springs, nor overdimensioning of the magnets and their suspension, are necessary. Lifting and setting down of the magnets becomes possible by consistent switching on and off of the supply and control voltages. The measurement ranges required for the gap sensors are small, and this leads to a substantial simplification of the sensors. Overloads of the vehicle and track upon failure of the magnetic flux supply or overcontrol of several magnets are reliably avoided, as the mean fall gap corresponds to the nominal air gap, which in the inventive arrangement is only about 7 to 9 mm, and only the carrying magnet mass sets down. The forces are introduced onto the track in a way that is distributed over the vehicle length and friction value fluctuations during the gliding phase average out due to the many skids. The power needed per magnet is also low.

Specifically, the invention can be advantageously practiced as follows.

Because of the fact that successive magnets, lying one behind the other in the travel direction, are connected by ball joints displaceable in the lengthwise direction of the vehicle, the ends of the magnets are necessarily held at the same distance from the track and also, due to the autonomous gap regulating circuits and the gliding means, static redundancy is achieved. During deexcitation or complete failure of single magnets, their setting down onto their glide system is prevented.

A plurality of support or hover frames are provided in each side of the vehicle. Each supports spring suspended magnets which are connected by pairs of joints lying vertically one above the other at as large a distance as possible. The vehicle superstructure is supported by a spring element on each of the total of four hover frame groups. In this way only relative movements of the hover structures to each other about a vertical axis are possible and the hover frames are rigidly connected in the vertical direction, so that despite the application of continuous forces into the vehicle, the four-point bearing customary in vehicle construction can be realized with optimum running characteristics during travel along curves.

Through a roll-stiff coupling of the left and right hover frames of the hover structures, by an easily adjustable link construction, designed with the left and right halves of the hover structures as a link construction with load-dependent gauge adjustment, a displacement of the forces of the vehicle body, resulting from centrifugal forces and rolling torques, on carrying and travel magnets on one side (and hence a relief of the carrying magnets on the outside of the curve) as well as an improvement of the travel comfort through stiffer guiding of the vehicle in the curve zone and in wind gusts, is achieved.

A brake of the magnet suspension railway is advantageously designed so that glide means of a fork type design, embracing the glide rail or guide rail, comprise controllable glide skids that are resiliently supported in legs of the fork. In this way forces between the guide skids of a fork are compensated for. This force compensation is easy to achieve, for example, by using hydraulic cylinders that are connected to the skids. The automatic braking of the system thereby achievable upon a drive failure is advantageous. Contrary to previously known solutions, the brake power is introduced into the track and is distributed over the total vehicle length instead of at discrete points. In addition, through the many brake surfaces connected one behind the other, a largely constant coefficient of friction value with respect to the vehicle is achieved, even at locally different rail conditions caused by weather, corrosion and other factors. Through the introduction of uniform brake power, the dimensional design can be made to be inexpensive, in particular, with respect to the track equipment.

Even without actuation of this brake, the supporting carrying magnets can be used as a supplementary electromagnetic brake by controlled under-excitation or over-excitation of the magnets, the glide skids serving as brake skids, and the glide rail as brake surface. The advantageous properties of the braking distributed over the total vehicle length also come to bear in this case.

In accordance with a preferred embodiment of the invention, ball joints are provided which displaceably connect the magnets lying one behind the other in the lengthwise direction of the vehicle. Further joints, vertically spaced one above the other connect the hover frames on each side of the vehicle and a spring element on each of the total of four hover frame groups supports the superstructure. Still further, link means are provided for movably coupling the left and righthalves of the hover frames with load dependent gauge adjustment. Fork-type glide means are preferably provided for embracing a glide rail and include controllable skids resiliently supported in the fork legs as mentioned above.

It is a further object of the invention to provide a magnetic suspension railway which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION

Figure 1:
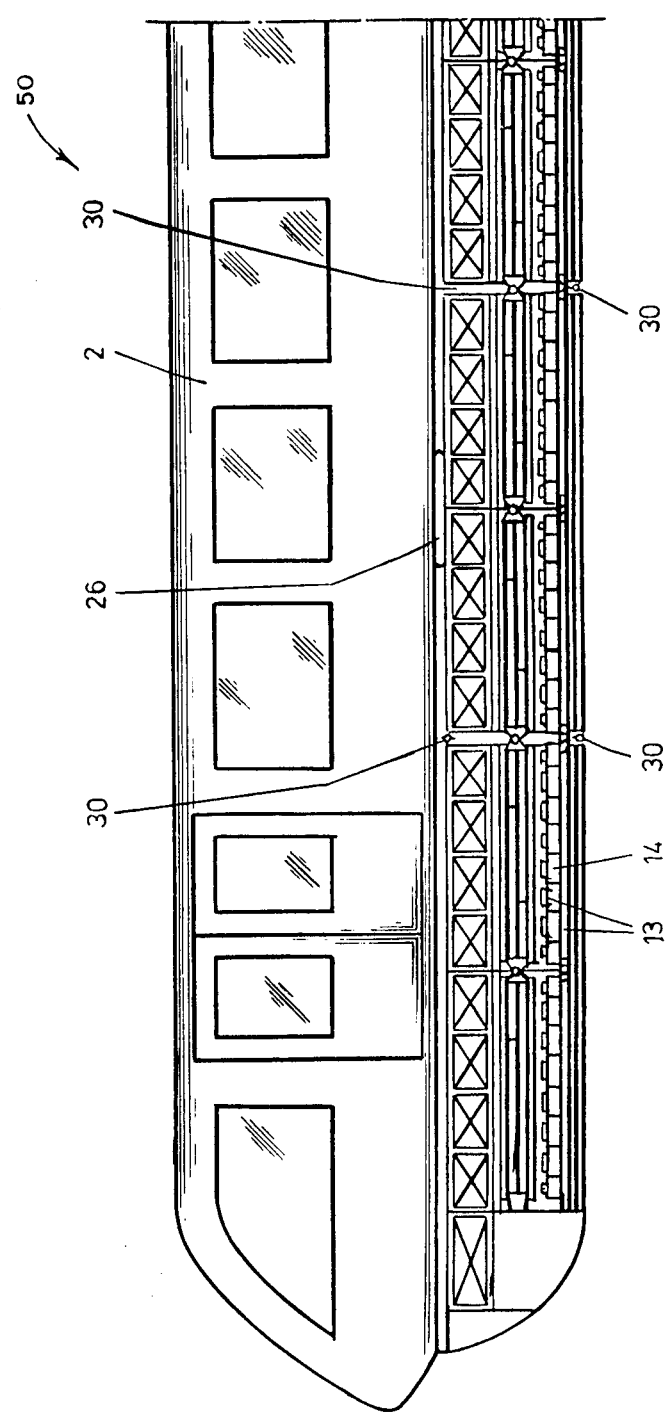
FIG. 1 shows a schematic side view of the front part of a suspension railway vehicle with the carrying and guiding part covering broken away.

Referring to the drawings in particular, wherein like reference characters designate like or corresponding parts throughout the several views, there is shown a magnetic suspension railway vehicle 50 and a magnetic suspension railway which includes a supporting and drive rail 1. The supporting and drive rail 1 is designed to act as a long-stator motor and has a laminated iron core. The vehicle 50 is composed of railway cars 2 which are resiliently supported by springs on hover structures. The hover structures are movably coupled together in longitudinal direction. Each hover structure is divided into a plurality of hover frames 3 or 4 and designed with movable coupling of the parts and which are supported, guided and driven by supporting and driving longitudinal flux magnets 5 resiliently supported on the hover structures and by resiliently articulated guiding transverse flux magnets 6. The gap distances from the supporting, driving and guiding rail 1 are measured by gap sensors and are regulated by control of the current supplied to the magnets.

Each magnet, both the supporting and the driving magnets 5 and the guiding transverse flux magnets 6, comprises an even number of four or more coils. The length of the turns of the coils of the transverse flux magnets 6 (FIGS. 3 to 6), are selected so that within the magnet the adjacent core periphery 7, 8 do not coincide.

Figure 2:
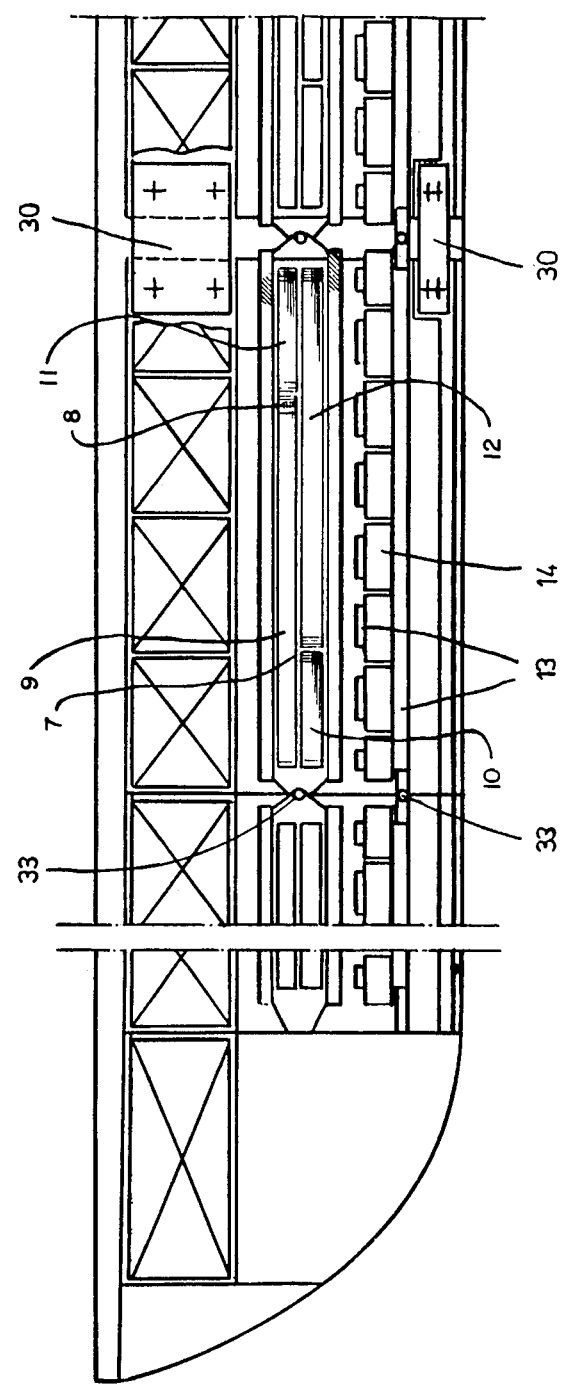
FIG. 2 is an enlarged representation of the lower, front porton of the vehicle according to FIG. 1.
Figure 3:
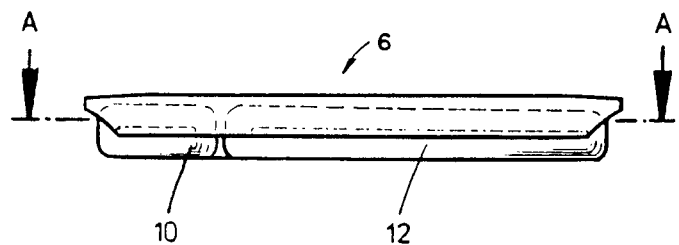
FIG. 3 shows a coil arrangement for guiding transverse flux magnets in lateral view in a U-shaped magnet.
Figure 4:
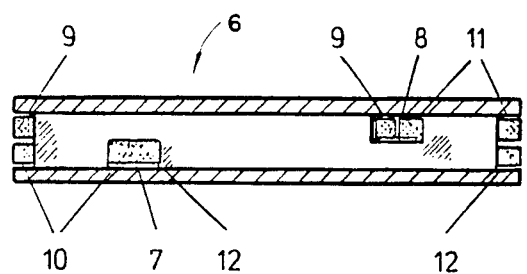
FIG. 4 is the section taken along line 4—4 of FIG. 3.
Figure 5:
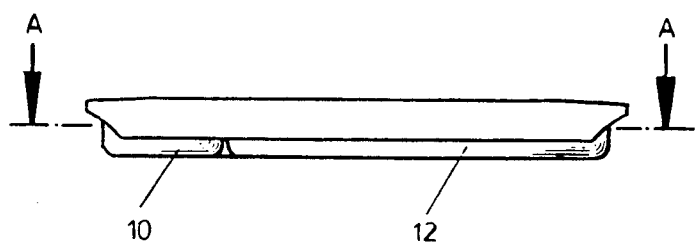
FIG. 5 illustrates a coil arrangement for guiding transverse flux magnets in lateral view in an E-shaped magent.
Figure 6:
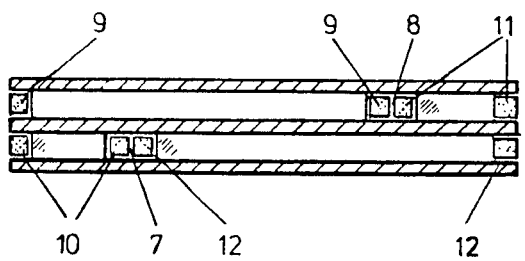
FIG. 6 is a section along line 6—6 of FIG. 5.
Figure 7:
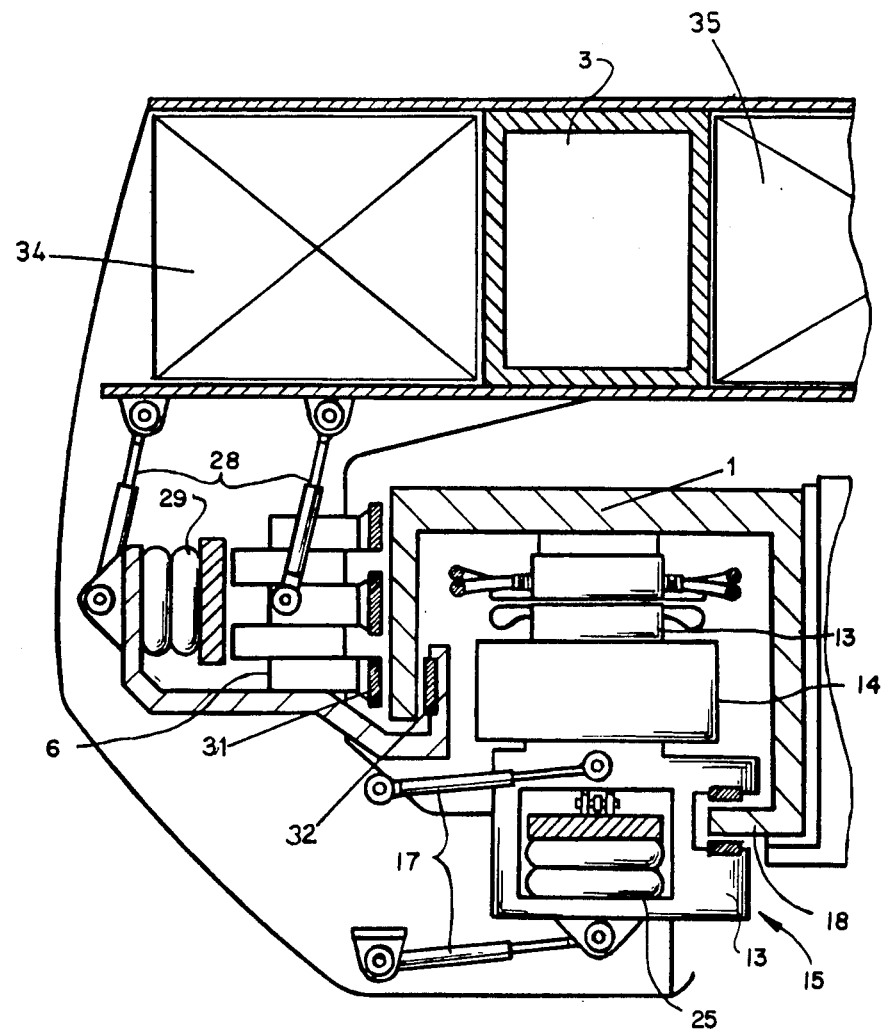
FIG. 7 is a transverse section through the carrying and drive rail illustrating a part of the hover structure cooperating with it.
Figure 8:
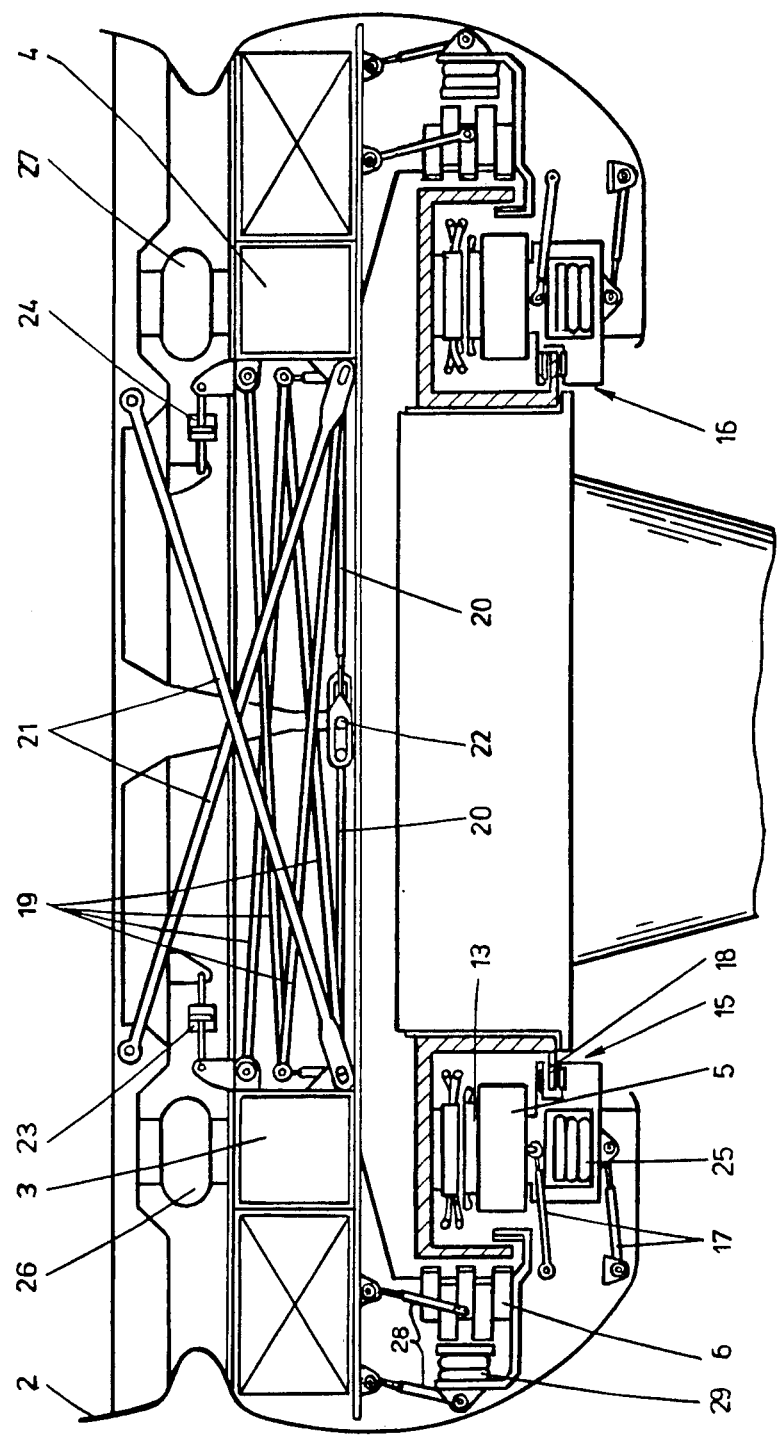
FIG. 8 is a transverse section through the lower vehicle portion with hover frames and the link connecting the hover frames.

The regulation of the guiding force of the transverse flux magnets is effected by interconnecting pairs of coils 9 and 10, or 11 and 12, respectively, of different length and lying side by side, each having an autonomous gap control loop (not shown). In the supporting and driving longitudinal flux magnets 5, two groups of coils are connected to autonomous gap control loop of their own. Magnets lying one behind the other, in lengthwise direction composed of a magnet core 13, magnet coils 14 and glide means or skids 15,16, secured to the magnet core 13 with eight poles, as shown in FIG. 2, are articulated to the hover structure by a double link 17 (FIGS. 7 and 8). The glide skids 15, 16 on the magnet core 13 are disposed at a resultant force engagement point of the magnet wall which are interconnected to form a control loop. The glide skids 15,16 embrace a horizontally projecting rail 18 of the track in fork-like fashion, so that one portion of the skid overlies horizontally projecting rail 18 and another portion of the skid underlies the rail 18.

The hover frames at the left (3) and at the right (4), as seen in FIG. 8, are connected by a link construction 19, 20, 21 with load-dependent gauge adjustment. A rolling torque resulting when negotiating a curve is transmitted via a pin 22 to the base of a slot of an eye on rod 20 and pushes the hover frames 3 and 4 apart. The rods 19 of the link construction prevent a rotation of the hover frames 3, 4 and hold the frames parallel. Additionally, the links 21 provide, upon increase of the vertical loads through the vehicle body, for example, through centrifugal forces in superelevated curves, for a further widening of the gauge and hence through the progressive spring support of the guiding magnets 6 an absorption of the corresponding loads by the latter.

As best shown in FIG. 8, between the hover structures 3, 4 and the car box 2, unilaterally acting dampers 23, 24 are articulated so as to offer no resistance to the gauge enlargement, but to greatly damp spring-back forces. Springs 25, by which the magnets are connected to the hover frames 3,4 are air springs and are supplied with air of equal pressure through control valves of a level regulating device of the vehicle cell spring system 26, 27. The springs 25 are provided with double-action check valves (not shown). Between the cars 2 and the hover frames 3, 4 there are arranged velocity-dependent controlled hydraulic dampers (also not shown). The articulation of the guiding transverse flux magnets 6 to the hover structure 3 is similarly effected through double links 28 and pneumatic springs 29. The hover frames 3, 4 are connected in lengthwise direction by yaw joints 30 (FIG. 2).

The supporting and drive longitudinal flux magnets 5 follow the track course with respect to deviations of the vertical position and variation of the incline by regulated rotary motion and translation. Upon simultaneous magnetic flux failure at several magents located one behind the other, or total failure of the magnetic flux supply, almost equivalent following is ensured by the glide skids 15,16 of the carrying magnets and skids 31, 32 of the guiding magnets. It is favorable in this connection that successive magnets lying one behind the other are connected by joints 33, namely both for the supporting magnets 5 and for the guiding magnets 6. The suspension of the magnets with double links 17, 28 and the air spring system 25, 29 permit low suspension frequencies of approximately 2 Hz and the hover frames 3, 4 follow the middle track course with a low level of vibrations even at total failure of the magnetic flux supply. This also facilitates the installation of the auxiliary units into the hover frame, namely, the electronics of the gap control loops 34 and the energy supply and pneumatic system 35, without danger to or disturbance of the units. The connection of the left and right hover frames by yaw joints 30 makes the hover structures rigid in vertical direction, but easily movable in curves. For each car, two hover structures are employed. The forces transmitted by rolling torques of the car box to the hover frames via the link construction enlarge the gauge, the frames being displaced parallelly, and lead to the relief of the carrying magnets 5 on the inside of the curve. The connection of each car box 2 with only four vehicle cell spring elements 26, 27 leaves the hover structures full freedom of movement for following in curved rail course. The design of the vehicle cellspring system 26, 27 with pneumatic springs with level control and regulating devices benefits the travel comfort and makes possible a horizontal positioning of the bottoms of the car boxes e.g. in a slow travel through superelevated curves or when standing in curves.

Thus, in accordance with the invention, there is provided, in a magnetic suspension railway system, with electromagnetic carrying, guiding and driving gear, of the type wherein the forces of supporting and transverse guiding flux magnets support guide, drive and brake the vehicle. The magnets regulate the gap distances from the track rails which is measured by gap sensors, and wherein the magnets are mounted in structures through spring systems in such a way that both supporting and guiding magnets as well as the supporting magnets on two longitudinal sides of the vehicle are separated from each other and the structures are coupled to the vehicle superstructure or body through spring systems, there the improvement is characterized in (a) that each magent 5,6 has four or more coils 9 to 12 and 14;

(b) that the cell lengths of the transverse flux magnets 6 are selected so that within the magnet the joints 7, 8 of coils which lay side by side do not coincide;

(c) that the coils 9 to 12, and 14 of the magnets are divided into two identical groups in such a way that the coils of each group are distributed over the total length of the magnet, to the extent possible, and that they are arranged so that the groups supply the torques required for the stabilization of the pitch movement;

(d) that the coils of each group are assigned to an autonomous gap control loop;

(e) that the free motion play of the supporting or or carrying 5 and guiding magnets 6 relative to the track is limited to the gap deviations to be expected in service by glide means in vertical 15,16 and horizontal direction 31, 32.

In accordance with a preferred embodiment of the inventive magnetic suspension railway, the magnets; lying one behind the other, are connected by ball joints 33 displaceable in lengthwise direction of the vehicle.

The magnetic suspension railway according to the above, may be further characterized in accordance with a preferred embodiment in that, seen from the vehicle center, one half of the hover frames 3, 4 of a vehicle side, from which the magnets 5, 6 are resiliently suspended, are connected by pairs of joints 30 lying vertically one above the other at as large as possible a distance and the vehicle superstructure is supported by a spring element 26,27 on each of the total of four hover frame groups. The movable coupling of the left and right halves of the hover structures 3, 4 is preferably designed as a link construction 19, 20,21 with load-dependent gauge adjustment. In accordance with another prefeffed feature, a fork-type glide means embracing the glide rail or, guiding rail contain controllable glide skids 15,16 is spring-supported in the fork leg, and between the glide skids of a fork force compensation is ensured.

While a specific embodiment of the invention has been shown and described in detail to illustrate the application of the principles of the invention, it will be understood that the invention may be embodied otherwise without departing from such principles.

What is claimed is:

1. In a suspension system for a magnetic suspension railway vehicle that is to travel in a longitudinal direction on a track having supporting rails, the suspension system including a plurality of hover frames distributed in the longitudinal direction and disposed on both sides of the vehicle, spring means connected to the hover frame for supporting the vehicle and for coupling the vehicle to the hover frames, a supporting magnet resiliently mounted to each hover frame for interacting with one of the supporting rails to support, guide, drive and brake and vehicle on the rail, a transverse magnet resiliently mounted to each hover frame for interacting with one of the supporting rails to laterally guide the vehicle with respect to the rail, gap control loop means connected to the supporting magnet and the transverse magnet of each hover frame for regulating a gap distance between each supporting and transverse magnet and the supporting rail interacting therewith, the gap control loop means having a plurality of autonomous gap control loops, the improvement comprising:

(a) each of said supporting and transverse magnets including at least four coils;

(b) each transverse magnet having adjacent coils with coil lengths selected so that, within each transverse magnet, coil peripheries of adjacent coils lie side-by-side and do not coincide;

(c) said coils of said supporting magnet and of said magnet being divided into two identical groups, the coils of each group being distributed over the total length of its respective magnet, each group being arranged so as to apply torques to its respective magnet with respect to the rails which is required for stabilization of a pitch movement for its respective magnet;

(d) the coils of each group being operatively connected to a separate autonomous gap control loop of the gap control loop means; and (e) glide means connected to each of the supporting magnets and to each of the transverse magnets for engagement with one of the supporting rails to limit a free relative movement between the supporting and transverse magnets and the supporting rail.

2. The suspension system according to claim 1, including an articulating joint connected between the supporting magnets of adjacent hover frames which are distributed in the longitudinal direction and an articulated joint connected between the transverse magnets of said adjacent hover frames.

3. The suspension system of claim 1, wherein the hover frame of the vehicle are divided into four groups of hover frames, the spring means comprising a spring element connected between each group of hover frames and the vehicle, and vertically spaced joints which are disposed one above the other connected between adjacent hover frames distributed in the longitudinal direction.

4. The suspension system according to claim 1, including link means movably coupling hover frames on one side of the vehicle to hover frames on the other side of the vehicle.

5. The suspension system according to claim 1, wherein the glide means are fork-type glide means for embracing one of the supporting rails, the fork-glide means including fork legs and glide skids which are resiliently and controllably supported by the fork legs.

* * * * *